(12) United States Patent
Homme et al.

(10) Patent No.: US 6,753,531 B2
(45) Date of Patent: Jun. 22, 2004

(54) SCINTILLATOR PANEL AND RADIATION IMAGE SENSOR

(75) Inventors: Takuya Homme, Hamamatsu (JP); Toshio Takabayashi, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 175 days.

(21) Appl. No.: 09/971,644

(22) Filed: Oct. 9, 2001

(65) Prior Publication Data

US 2002/0027200 A1 Mar. 7, 2002

Related U.S. Application Data

(63) Continuation-in-part of application No. PCT/JP99/01912, filed on Apr. 9, 1999.

(51) Int. Cl.⁷ .................................. G01T 1/20
(52) U.S. Cl. .................... 250/368; 250/361 R
(58) Field of Search ............... 250/361 R, 367, 250/368, 483.1, 370.11, 458.1

(56) References Cited

U.S. PATENT DOCUMENTS

| | | | | |
|---|---|---|---|---|
| 4,922,105 A | | 5/1990 | Hosoi ...................... 250/484.1 |
| 5,153,438 A | | 10/1992 | Kingsley et al. ......... 250/370.09 |
| 5,208,460 A | | 5/1993 | Rougeot et al. ............. 250/368 |
| 5,227,635 A | | 7/1993 | Iwanczyk .............. 250/370.12 |
| 5,830,332 A | * | 11/1998 | Babih et al. ............ 204/192.15 |
| 5,848,124 A | | 12/1998 | Inazuru ...................... 378/140 |
| 5,860,584 A | | 1/1999 | Inazuru ...................... 228/121 |
| 6,031,234 A | * | 2/2000 | Albagli et al. .......... 250/370.11 |
| 6,429,437 B1 | * | 8/2002 | Laugier ................. 250/370.11 |

FOREIGN PATENT DOCUMENTS

| | | |
|---|---|---|
| EP | 0 303 730 | 2/1989 |
| EP | 0 903 590 | 3/1999 |
| EP | 0 932 053 | 7/1999 |
| EP | 1 024 374 | 8/2000 |
| EP | 1 115 011 | 7/2001 |
| EP | 1 118 878 | 7/2001 |
| EP | 1 118 879 | 7/2001 |
| EP | 1 118 880 | 7/2001 |
| FR | WO 99/38031 | 7/1999 |
| JP | 56-89702 | 7/1981 |
| JP | 61-73901 | 4/1986 |
| JP | 63-215987 | 9/1988 |
| JP | 1-191087 | 8/1989 |
| JP | 01-240887 | 9/1989 |
| JP | 1-240887 | 9/1989 |
| JP | 1-267500 | 10/1989 |
| JP | 1-269083 | 10/1989 |
| JP | 4-174400 | 6/1992 |
| JP | 5-60871 | 3/1993 |
| JP | 5-107362 | 4/1993 |
| JP | 5-39558 | 6/1993 |
| JP | 5-180945 | 7/1993 |
| JP | 5-188148 | 7/1993 |
| JP | 5-203755 | 8/1993 |
| JP | 5-299044 | 11/1993 |
| JP | 7-27863 | 1/1995 |
| JP | 7-21560 | 3/1995 |
| JP | 7-209495 | 8/1995 |
| JP | 7-270599 | 10/1995 |
| JP | 8-198687 | 8/1996 |
| JP | WO 98/36290 | 8/1998 |
| JP | WO 98/36291 | 8/1998 |

(List continued on next page.)

Primary Examiner—Constantine Hannaher
Assistant Examiner—Timothy Moran
(74) Attorney, Agent, or Firm—Morgan, Lewis & Bockius LLP

(57) ABSTRACT

A surface of a substrate made of Al in a scintillator panel 1 is sandblasted, whereas one surface thereof is formed with an $MgF_2$ film as a low refractive index material. The surface of $MgF_2$ film is formed with a scintillator having a columnar structure for converting incident radiation into visible light. Together with the substrate, the scintillator is covered with a polyparaxylylene film.

8 Claims, 4 Drawing Sheets

FOREIGN PATENT DOCUMENTS

| | | |
|---|---|---|
| JP | WO 99/66345 | 12/1999 |
| JP | WO 99/66346 | 12/1999 |
| JP | WO 99/66347 | 12/1999 |
| JP | WO 99/66348 | 12/1999 |
| JP | WO 99/66349 | 12/1999 |
| JP | WO 99/66350 | 12/1999 |
| JP | WO 99/66351 | 12/1999 |
| JP | WO 99/67658 | 12/1999 |
| JP | WO 99/67659 | 12/1999 |
| JP | WO 00/62098 | 10/2000 |
| JP | 2000-356679 | 12/2000 |

* cited by examiner

SCINTILLATOR PANEL AND RADIATION IMAGE SENSOR

RELATED APPLICATIONS

This is a Continuation-In-Part application of International Patent Application Ser. No. PCT/JP99/01912 filed on Apr. 9, 1999 now pending.

BACKGROUND OF THE INVENTION

1. Field of the Invention

The present invention relates to a scintillator panel and a radiation image sensor which are used in medical X-ray photography and the like.

2. Related Background Art

While X-ray sensitive films have conventionally been used in medical and industrial X-ray photography, radiation imaging systems using radiation detectors have been coming into widespread use from the viewpoint of convenience and storability of photographed results. In such a radiation imaging system, pixel data caused by two-dimensional radiation are acquired as an electric signal by a radiation detector, and this signal is processed by a processing unit, so as to be displayed on a monitor.

Conventionally known as a typical radiation detector is one having a structure in which a scintillator panel comprising a scintillator formed on a substrate made of aluminum, glass, fused silica, or the like and an imaging device are cemented together. In this radiation detector, the radiation entering from the substrate side is converted by the scintillator into light, which is then detected by the imaging device (see Japanese Patent Publication No. HEI 7-21560).

Meanwhile, though it is necessary for the scintillator panel to have a sufficiently high optical output in order to attain clear images in a radiation detector, the optical output has not been sufficient in the above-mentioned radiation detector.

SUMMARY OF THE INVENTION

It is an object of the present invention to provide a scintillator panel having an enhanced optical output, and a radiation image sensor using a scintillator panel having an enhanced optical output.

The scintillator panel in accordance with the present invention comprises a radiation-transmitting substrate, a light-transmitting thin film disposed on the substrate, a scintillator deposited on the light-transmitting thin film, and a protective film covering the scintillator, wherein the light-transmitting thin film has a refractive index lower than that of the scintillator.

Since the light-transmitting thin film having a refractive index lower than that of the scintillator is disposed between the substrate and the scintillator in this scintillator panel, the light generated from the scintillator can be reflected by the light-transmitting thin film to the optical output side, whereby the optical output of scintillator panel can be enhanced.

The radiation image sensor in accordance with the present invention comprises a scintillator panel comprising a radiation-transmitting substrate, a light-transmitting thin film disposed on the substrate, a scintillator deposited on the light-transmitting thin film, and a protective film covering the scintillator, wherein the light-transmitting thin film has a refractive index lower than that of the scintillator; and an imaging device arranged so as to face the scintillator.

In this radiation image sensor, since the light-transmitting thin film having a refractive index lower than that of the scintillator is disposed between the substrate and the scintillator in the scintillator panel, the optical output of scintillator panel increases. As a consequence, the output of radiation image sensor can be enhanced.

DETAILED DESCRIPTION OF THE PREFERRED EMBODIMENTS

Figure 1:
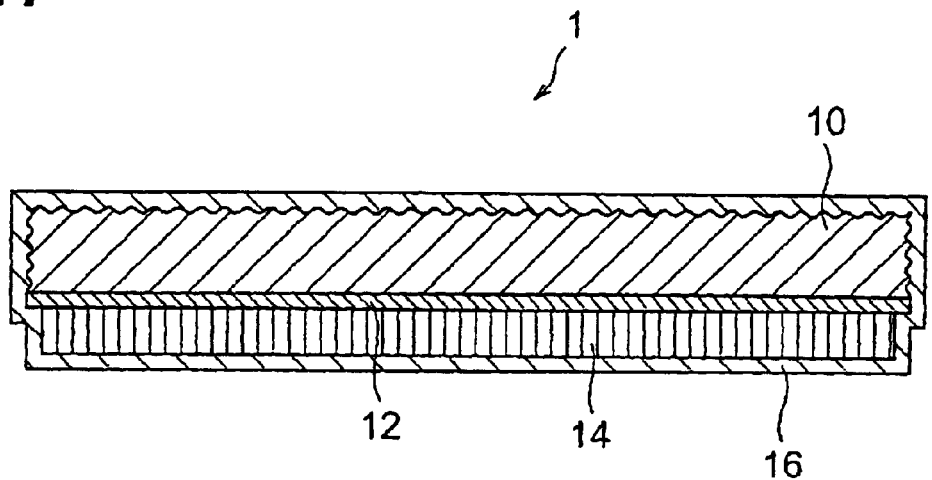
FIG. 1 is a sectional view of the scintillator panel in accordance with a first embodiment.

In the following, a first embodiment of the present invention will be explained with reference to FIGS. 1, 2, and 3A to 3D. FIG. 1 is a sectional view of a scintillator panel 1, whereas FIG. 2 is a sectional view of a radiation image sensor 2.

As shown in FIG. 1, one surface and side faces of a substrate 10 made of Al in the scintillator panel 1 are sandblasted, whereas the other surface is processed into a mirror surface. Also, the other surface is formed with an $MgF_2$ film (refractive index=1.38) 12 as a low refractive index material (material having a refractive index lower than that of a scintillator 14). The surface of this $MgF_2$ film 12 is formed with the scintillator 14 having a columnar structure for converting incident radiation into visible light. Here, Tl-doped CsI (refractive index=1.8) is used for the scintillator 14. Together with the substrate 10, the scintillator 14 is covered with a polyparaxylylene film 16.

Figure 2:
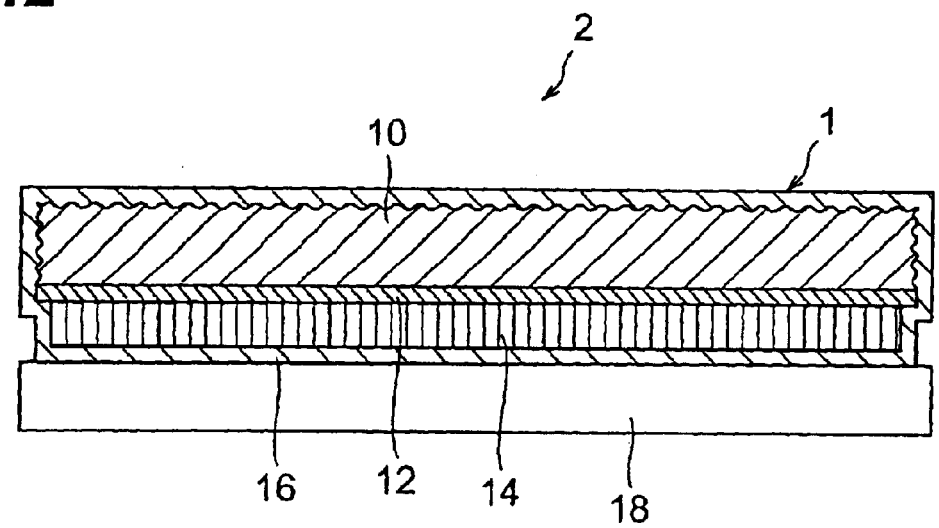
FIG. 2 is a sectional view of the radiation image sensor in accordance with the first embodiment.

As shown in FIG. 2, on the other hand, the radiation image sensor 2 has a structure in which an imaging device 18 is attached to the scintillator panel 1 on the front end side of the scintillator 14.

With reference to FIGS. 3A to 3D, manufacturing steps of the scintillator panel 1 will now be explained. First, one surface and side faces of a rectangular or circular substrate 10 made of Al (having a thickness of 1 mm) are sandblasted with glass beads (#800). This sandblasting erases rolling streaks on the surface of substrate 10 and forms fine irregularities on the surface of substrate 10 (see FIG. 3A). The other surface of substrate 10 is processed into a mirror surface.

Figure 3A:
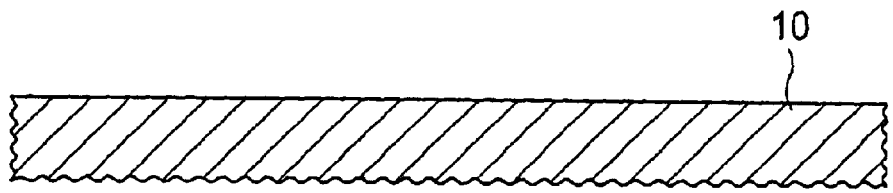
FIG. 3A is a view showing a manufacturing step of the scintillator panel in accordance with the first embodiment.
Figure 3B:
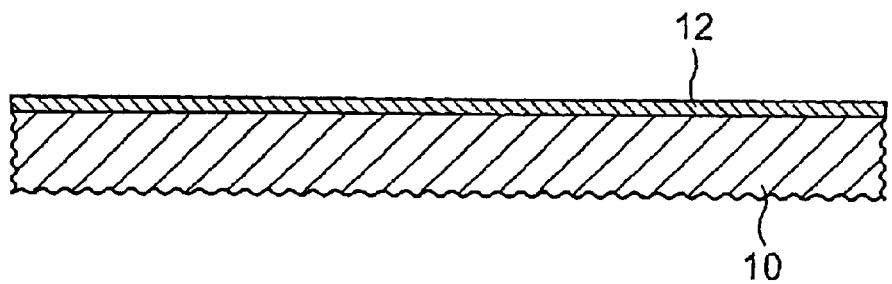
FIG. 3B is a view showing a manufacturing step of the scintillator panel in accordance with the first embodiment.
Figure 3C:
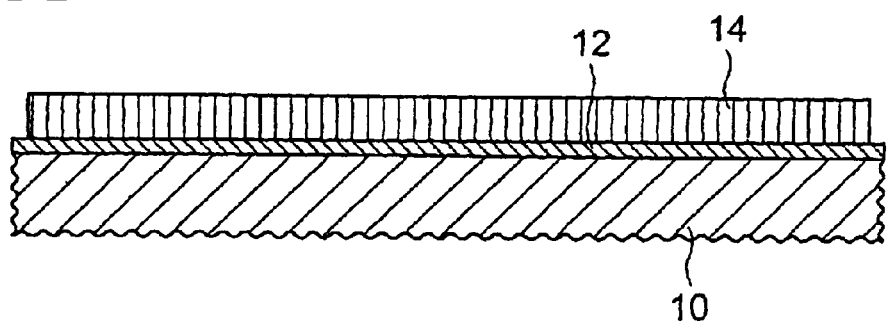
FIG. 3C is a view showing a manufacturing step of the scintillator panel in accordance with the first embodiment.
Figure 3D:
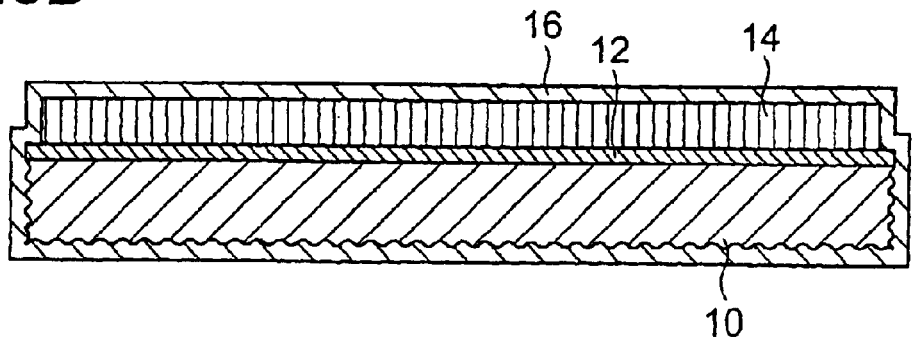
FIG. 3D is a view showing a manufacturing step of the scintillator panel in accordance with the first embodiment.

Subsequently, an $MgF_2$ film (light-transmitting thin film) 12 as a low refractive index material is formed with a thickness of 100 nm on the other surface of substrate 10 by vacuum deposition method (see FIG. 3B). Then, columnar crystals of Tl-doped CsI are grown on the surface of MgF$_2$ film by vapor deposition method, so as to form a scintillator 14 with a thickness of 250 μm (see FIG. 3C).

Since CsI forming the scintillator 14 is highly hygroscopic so that it will deliquesce by absorbing vapor in the air if left exposed, a polyparaxylylene film 16 is formed by CVD method in order to prevent this from happening. Namely, the substrate 10 formed with the scintillator 14 is put into a CVD apparatus, so that the polyparaxylylene film 16 is formed with a thickness of 10 μm. As a consequence, all the surfaces of scintillator 14 and substrate 10 are formed with the polyparaxylylene film 16 (see FIG. 3D). Since one surface and side faces of the substrate 10 are formed with fine irregularities upon sandblasting, the adhesion between the polyparaxylylene film 16 and the substrate 10 can be improved, whereby the polyparaxylylene film 16 and the substrate 10 can be prevented from peeling off each other.

If an imaging device (CCD) 18 is attached to thus completed scintillator panel 1 such that the light-receiving section thereof faces the front end side of the scintillator 14, then the radiation image sensor 2 is made (see FIG. 2).

In the radiation image sensor 2 in accordance with this embodiment, the radiation incident from the substrate 10 side is converted by the scintillator 14 into light, which is then detected by the imaging device 18. The optical output can be increased by 20% in this case as compared with the case using a scintillator panel in which a scintillator is formed on a substrate without providing the MgF$_2$ film 12 as a low refractive index material. Namely, while the light generated in the scintillator 14 advances in all directions, the light satisfying the reflecting condition for total reflection is reflected by the MgF$_2$ film 12 as a low refractive index material, whereby the light incident on the light-receiving section of imaging device 18 can be increased.

A second embodiment of the present invention will now be explained. Here, constituents identical to those in the scintillator panel 1 and radiation image sensor 2 of the first embodiment will be explained with numerals identical to those used in the explanation of first embodiment.

Figure 4:
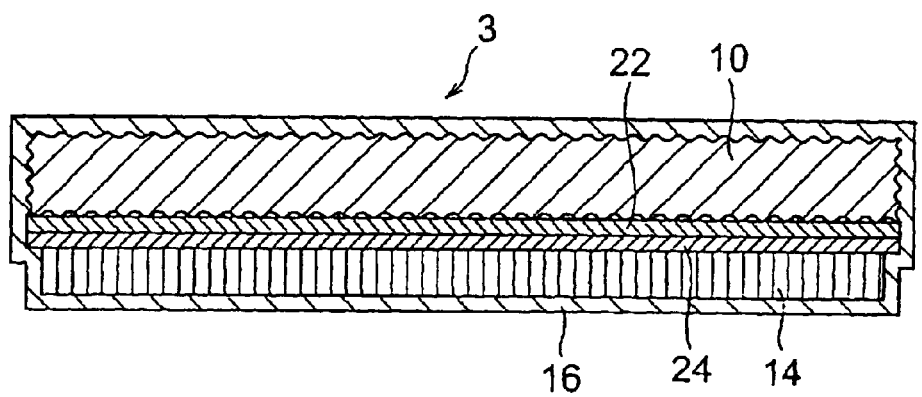
FIG. 4 is a sectional view of the scintillator panel in accordance with a second embodiment.
Figure 5:
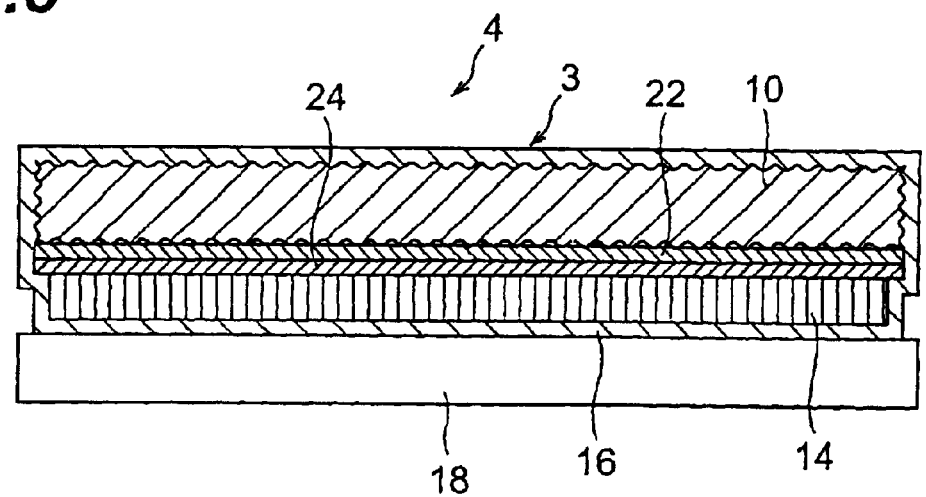
FIG. 5 is a sectional view of the radiation image sensor in accordance with the second embodiment.

FIG. 4 is a sectional view of a scintillator panel 3, whereas FIG. 5 is a sectional view of a radiation image sensor 4. As shown in FIG. 4, surfaces of a substrate 10 made of Al in the scintillator panel 3 are sandblasted, and one surface thereof is formed with an Ag film 22 as a reflecting film. Formed on the Ag film 22 is an LiF film (light-transmitting thin film) (refractive index=1.3) 24 as a low refractive index material (material having a refractive index lower than that of a scintillator 14). Further, the surface of LiF film 24 is formed with the scintillator 14 having a columnar structure for converting incident radiation into visible light. Here, Tl-doped CsI is used for the scintillator 14. Together with the substrate 10, the scintillator 14 is covered with a polyparaxylylene film 16.

As shown in FIG. 5, on the other hand, the radiation image sensor 4 has a structure in which an imaging device 18 is attached to the scintillator panel 3 on the scintillator 14 side.

Manufacturing steps of the scintillator panel 3 will now be explained. First, all the surfaces of a rectangular or circular substrate 10 made of Al (having a thickness of 1 mm) are sandblasted with glass beads (#800), so as to erase rolling streaks on the surfaces of substrate 10 and form fine irregularities on the surfaces of substrate 10.

Subsequently, an Ag film 22 as a reflecting film is formed with a thickness of 100 nm on one surface of the substrate 10 by vacuum deposition method, and an LiF film 24 as a low refractive index material is formed with a thickness of 100 nm on the Ag film 22 by vacuum deposition method. Then, columnar crystals of Tl-doped CsI are grown on the surface of LiF film 24 by vapor deposition method, so as to form a scintillator 14 with a thickness of 250 μm. Thereafter, a polyparaxylylene film 16 is formed with a thickness of 10 μm by CVD method. As a consequence, the polyparaxylylene film 16 is formed on all the surfaces of scintillator 14 and substrate 10.

If an imaging device (CCD) 18 is attached to thus completed scintillator panel 3 such that the light-receiving section thereof faces the front end part of scintillator 14, then the radiation image sensor 4 is made (see FIG. 5).

In the radiation image sensor 4 in accordance with this embodiment, the radiation incident from the substrate 10 side is converted by the scintillator 14 into light, which is then detected by the imaging device 18. The optical output can be increased by 20% in this case as compared with the case using a scintillator panel in which a scintillator is formed on a substrate without providing the Ag film 22 as a reflecting film and the LiF film 24 as a low refractive index material. Namely, while the light generated in the scintillator 14 advances in all directions, the Ag film 22 as a reflecting film and the LiF film 24 as a low refractive index material reflect the light advancing toward the Ag film 22 and LiF film 24, whereby the light incident on the light-receiving section of imaging device 18 can be increased.

A third embodiment of the present invention will now be explained. Here, constituents identical to those in the scintillator panel 1 and radiation image sensor 2 of the first embodiment and those in the scintillator panel 3 and radiation image sensor 4 of the second embodiment will be explained with numerals identical to those used in the explanation of first and second embodiments.

Figure 6:
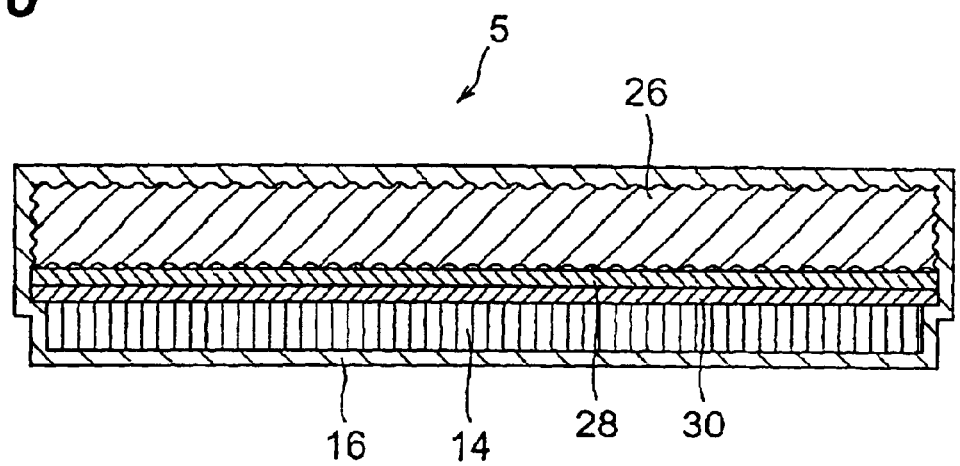
FIG. 6 is a sectional view of the scintillator panel in accordance with a third embodiment.
Figure 7:
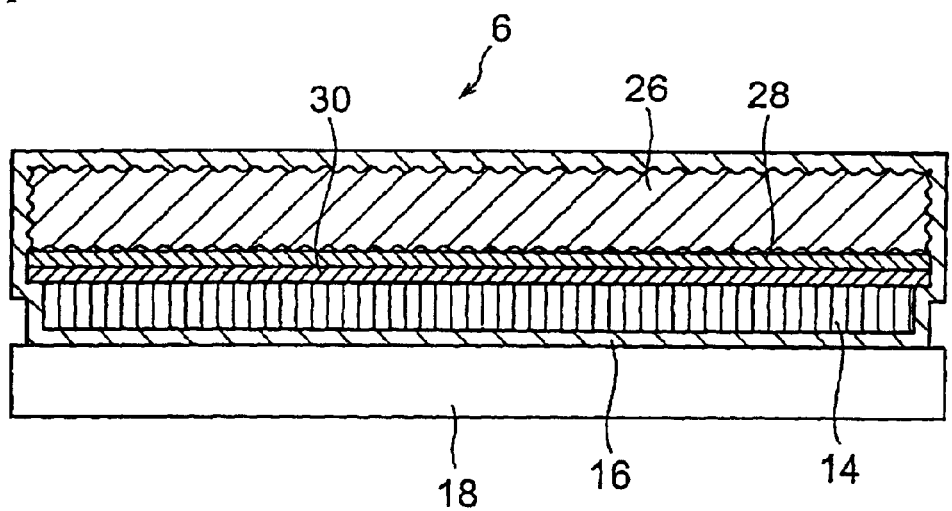
FIG. 7 is a sectional view of the radiation image sensor in accordance with the third embodiment.

FIG. 6 is a sectional view of a scintillator panel 5, whereas FIG. 7 is a sectional view of a radiation image sensor 6. As shown in FIG. 6, surfaces of a substrate 26 made of amorphous carbon (a-C) in the scintillator panel 5 are sandblasted, and one surface thereof is formed with an Al film 28 as a reflecting film. Formed on the Al film 28 is an SiO$_2$ film (light-transmitting thin film) (refractive index=1.5) 30 as a low refractive index material (material having a refractive index lower than that of a scintillator 14). Further, the surface of SiO$_2$ film 30 is formed with a scintillator 14 having a columnar structure for converting incident radiation into visible light. Here, Tl-doped CsI is used for the scintillator 14. Together with the substrate 26, the scintillator 14 is covered with a polyparaxylylene film 16.

As shown in FIG. 7, on the other hand, the radiation image sensor 6 has a structure in which an imaging device 18 is attached to the scintillator panel 5 on the front end side of the scintillator 14.

Manufacturing steps of the scintillator panel 5 will now be explained. First, surfaces of a rectangular or circular substrate 26 made of a-C (having a thickness of 1 mm) are sandblasted with glass beads (#1500), so as to form fine irregularities on the surfaces of substrate 26.

Subsequently, an Al film 28 as a reflecting film is formed with a thickness of 100 nm on one surface of the substrate 26 by vacuum deposition method, and an SiO$_2$ film 30 as a low refractive index material is formed with a thickness of 100 nm on the Al film 28 by vacuum deposition method. Then, columnar crystals of Tl-doped CsI are grown on the surface of SiO$_2$ film 30 by vapor deposition method, so as to form a scintillator 14 with a thickness of 250 μm.

Thereafter, a polyparaxylylene film 16 is formed with a thickness of 10 μm by CVD method. As a consequence, the polyparaxylylene film 16 is formed on all the surfaces of scintillator 14 and substrate 26.

If an imaging device (CCD) 18 is attached to thus completed scintillator panel 5 such that the light-receiving section thereof faces the front end side of the scintillator 14, then the radiation image sensor 6 is made (see FIG. 7).

In the radiation image sensor 6 in accordance with this embodiment, the radiation incident from the substrate 10 side is converted by the scintillator 14 into light, which is then detected by the imaging device 18. The optical output can be increased by 15% in this case as compared with the case using a scintillator panel in which a scintillator is formed on a substrate without providing the Al film 28 as a reflecting film and the $SiO_2$ film 30 as a low refractive index material. Namely, while the light generated in the scintillator 14 advances in all directions, the Al film 28 as a reflecting film and the $SiO_2$ film 30 as a low refractive index material reflect the light advancing toward the Al film 28 and $SiO_2$ film 30, whereby the light incident on the light-receiving section of imaging device 18 can be increased.

Though the $MgF_2$ film, LiF film, or $SiO_2$ film is used as the light-transmitting thin film in the above-mentioned embodiments, it may also be a film made of a material including a substance selected from the group consisting of LiF, $MgF_2$, $CaF_2$, $SiO_2$, $Al_2O_3$, MgO, NaCl, KBr, KCl, and AgCl.

Though CsI (Tl) is used as the scintillator 14 in the above-mentioned embodiments, CsI(Na), NaI(Tl), LiI(Eu), KI(Tl), and the like may also be used without being restricted thereto.

Though the substrate made of Al or the substrate made of a-C is used as the substrate 10 in the above-mentioned embodiments, any substrate can be used as long as it has a favorable X-ray transmissivity, whereby substrates made of C (graphite), substrate made of Be, substrates made of glass, and the like may also be used.

In the above-mentioned embodiments, polyparaxylylene includes not only polyparaxylylene but also polymonochloroparaxylylene, polydichloroparaxylylene, polytetrachloroparaxylylene, polyfluoroparaxylylene, polydimethylparaxylylene, polydiethylparaxylylene, and the like.

In the scintillator panel of the present invention, since the light-transmitting thin film having a refractive index lower than that of the scintillator is disposed between the substrate and the scintillator, the light generated from the scintillator can be reflected by the light-transmitting thin film to the optical output side, whereby the optical output of scintillator panel can be enhanced. As a consequence, images detected by the radiation image sensor using this scintillator panel can be made clear.

In the radiation image sensor of the present invention, since the light-transmitting thin film having a refractive index lower than that of the scintillator is disposed between the substrate and the scintillator in the scintillator panel, the optical output of scintillator panel increases. As a consequence, detected images can be made clear.

As in the foregoing, the scintillator panel and radiation image sensor of the present invention are suitably used for medical X-ray photography and the like.

What is claimed is:

1. A scintillator panel comprising:
   a radiation-transmitting substrate;
   a light-transmitting thin film disposed on said substrate;
   a scintillator deposited on said light-transmitting thin film; and
   a protective film covering said scintillator;
   wherein said light-transmitting thin film has a refractive index lower than that of said scintillator.

2. A scintillator panel according to claim 1, wherein said protective film further covers said substrate.

3. A scintillator panel according to claim 1 or 2, wherein said light-transmitting thin film is a film made of a material including a substance selected from the group consisting of LiF, $MgF_2$, $CaF_2$, $SiO_2$, $Al_2O_3$, MgO, NaCl, KBr, KCl, and AgCl.

4. A scintillator panel according to claim 1, wherein said substrate is a light-reflecting substrate.

5. A scintillator panel according to claim 1, wherein said substrate has a surface having a light-reflecting film.

6. A scintillator panel according to claim 1, wherein said substrate is a light-transmitting substrate.

7. A radiation image sensor comprising an imaging device arranged so as to face said scintillator in the scintillator panel according to claim 1.

8. A scintillator panel according to claim 1, wherein said light-transmitting thin film is directly disposed on said substrate.

* * * * *